April 16, 1968   R. J. EMINGER   3,377,690
COIL AND WEDGE INSERTING APPARATUS
Filed Feb. 16, 1966   6 Sheets-Sheet 1

Inventor:
Robert J. Eminger,
by Hood, Gust & Irish
Attorneys.

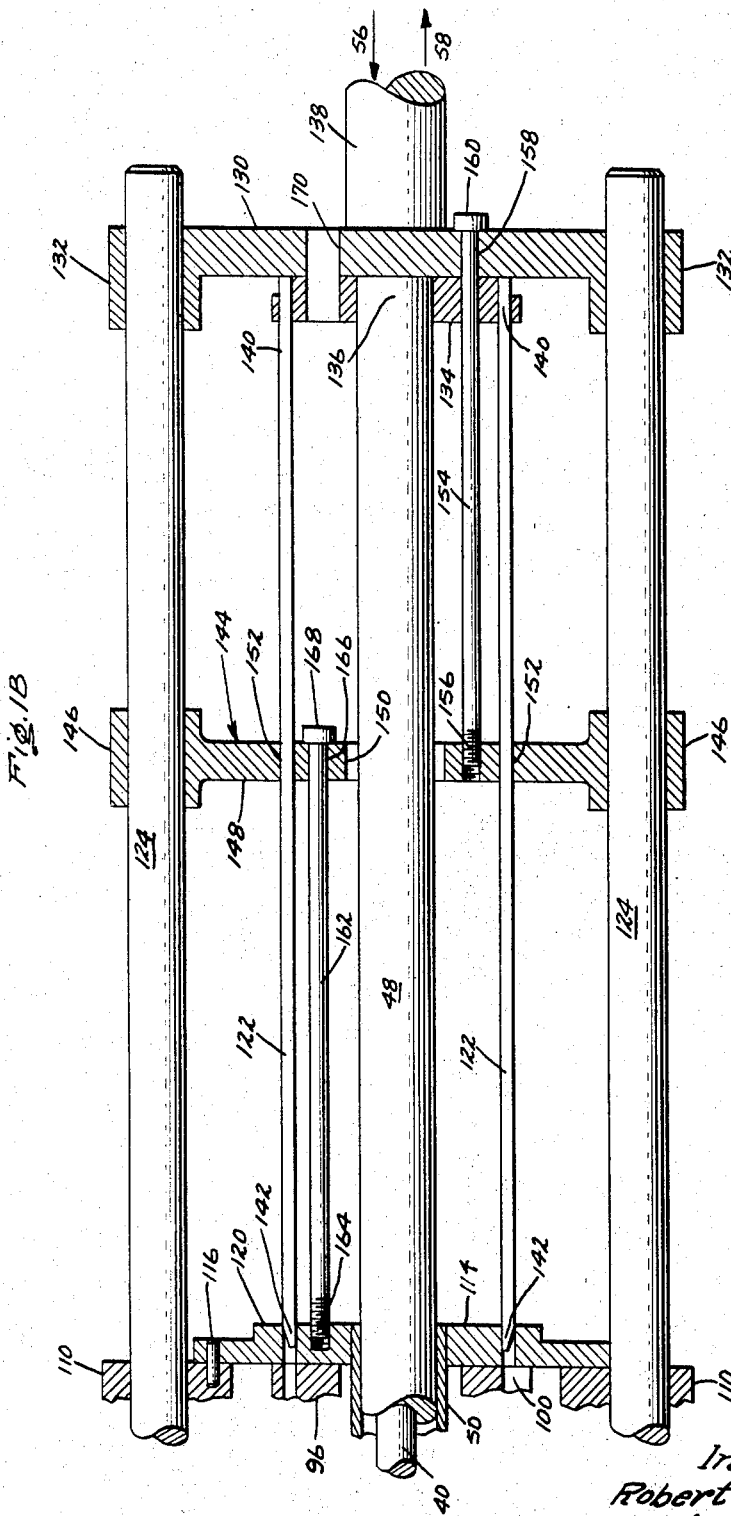

April 16, 1968   R. J. EMINGER   3,377,690
COIL AND WEDGE INSERTING APPARATUS
Filed Feb. 16, 1966   6 Sheets-Sheet 3

Inventor:
Robert J. Eminger,
by Hood, Gust & Irish
Attorneys.

April 16, 1968   R. J. EMINGER   3,377,690
COIL AND WEDGE INSERTING APPARATUS
Filed Feb. 16, 1966   6 Sheets-Sheet 4
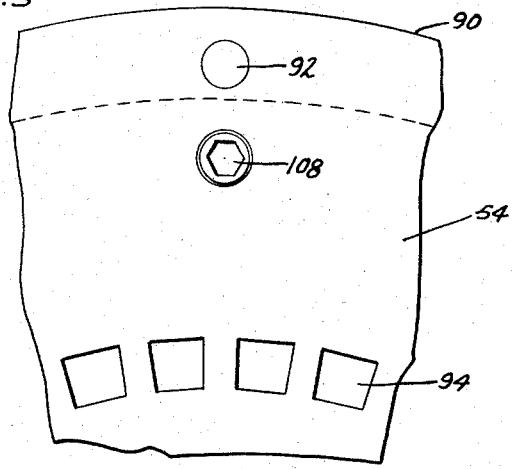
Fig. 5
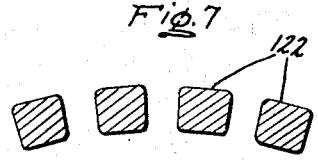
Fig. 7
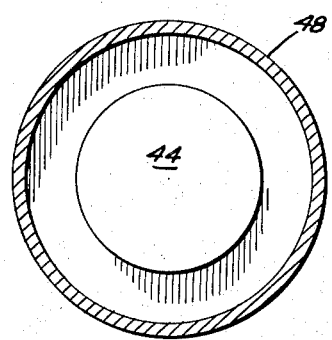
Inventor:
Robert J. Eminger,
by Hood, Gust & Irish
Attorneys.

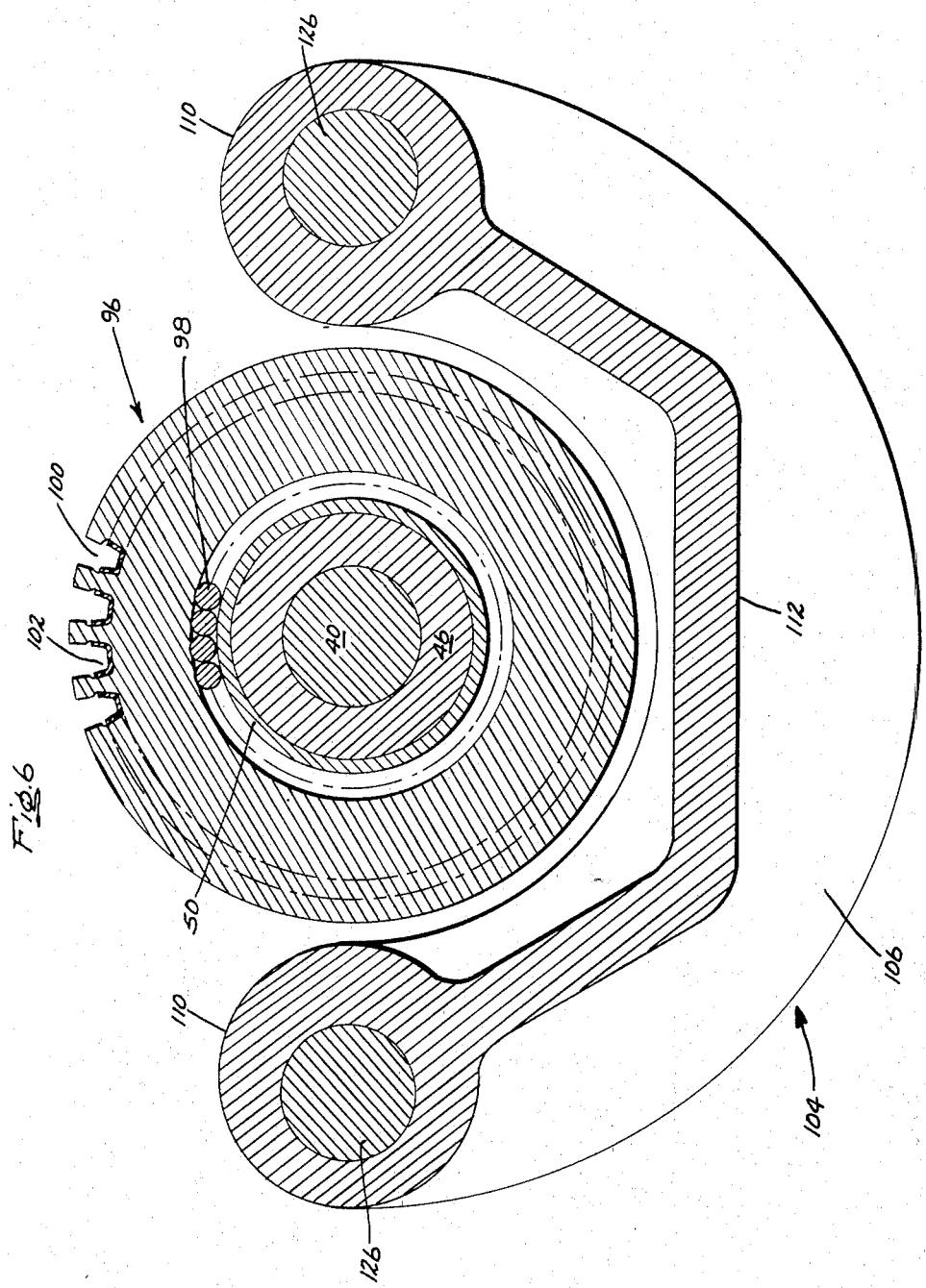

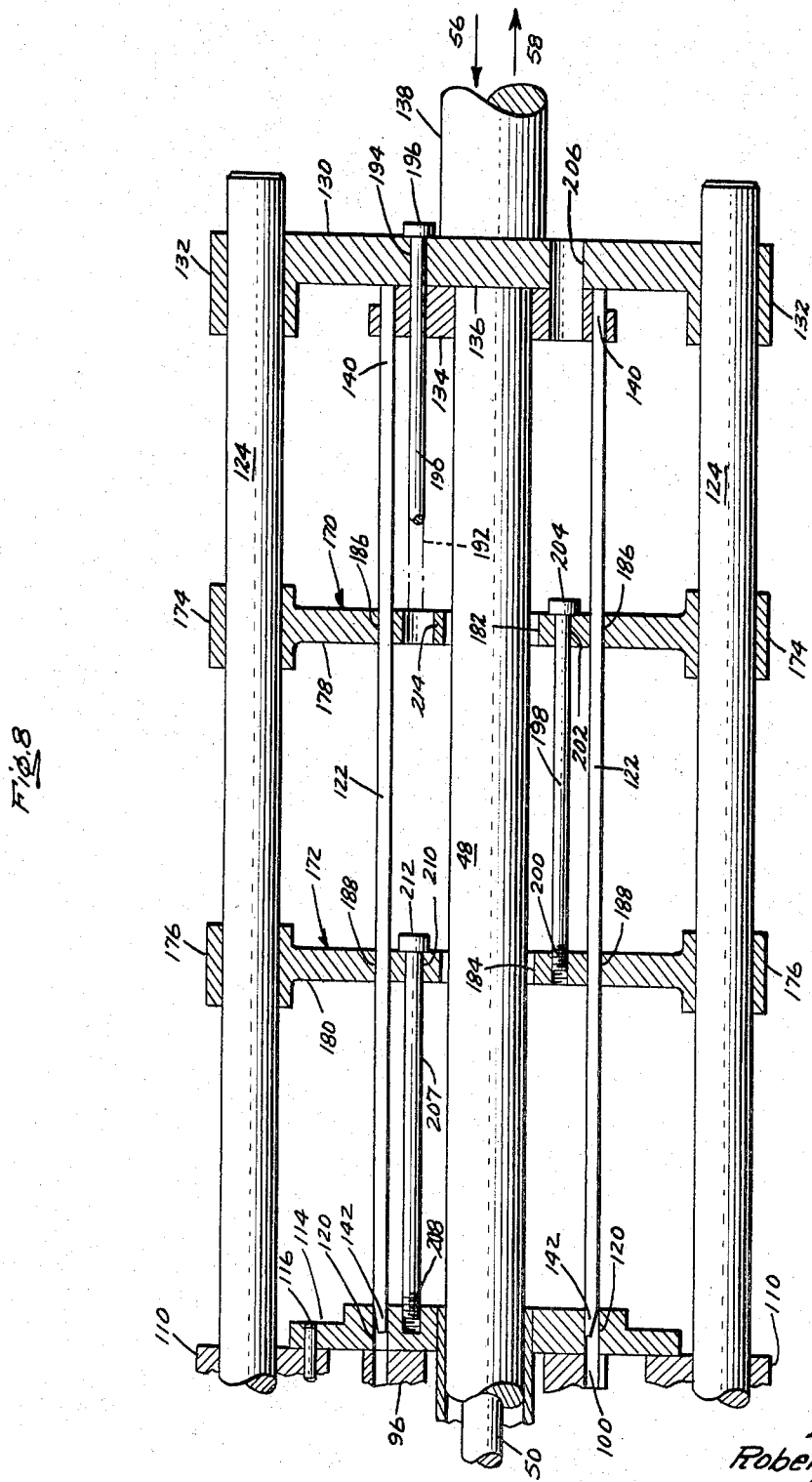

United States Patent Office 3,377,690
Patented Apr. 16, 1968

3,377,690
COIL AND WEDGE INSERTING APPARATUS
Robert J. Eminger, 7120 Melody Lane,
Fort Wayne, Ind. 46804
Filed Feb. 16, 1966, Ser. No. 527,981
7 Claims. (Cl. 29—205)

This invention relates generally to apparatus for inserting prewound coils and slot wedges into the slots of an internally slotted dynamoelectric machine core member.

In Patent No. 2,432,267 granted Dec. 9, 1947 to A. P. Adamson, there is disclosed an apparatus and method for inserting prewound coils into the slots of an internally slotted dynamoelectric machine core member. Apparatus has been provided in accordance with the Adamson patent which also inserts slot wedges into the core member slots over the coils positioned therein. Such apparatus incorporates elongated slot wedge pusher elements which push the slot wedges axially into the slots immediately following insertion of the respective coil sides therein. Such slot wedge pusher elements are of relatively small cross-sectional size with respect to their overall length and since appreciable axial force is required to push the slot wedges into the slots over the windings therein, there has been a tendancy for the slot wedge pusher elements to buckle during the pushing operation.

It is therefore desirable to provide such apparatus incorporating means for supporting the slot wedge pushing elements thereby to inhibit such buckling.

It is accordingly an object of the invention to provide improved apparatus for inserting prewound coils and slot wedges into the slots of an internally slotted dynamoelectric machine core member.

Another object of the invention is to provide improved apparatus for inserting prewound coils and slot wedges into the slots of an internally slotted dynamoelectric machine core member wherein buckling of the slot wedge pushing elements is inhibited.

The above-mentioned and other features and objects of this invention and the manner of attaining them will become more apparent and the invention itself will be best understood by reference to the following description of an embodiment of the invention taken in conjunction with the accompanying drawing, wherein:

FIGS. 1A and B jointly show a side view, partly in cross-section and partly broken away, of one embodiment of the invention;

FIG. 5 is a fragmentary, cross-sectional view taken generally along the line 5—5 of FIG. 1A;

FIG. 6 is a cross-sectional view taken generally along the line 6—6 of FIG. 1A;

FIG. 7 is a fragmentary, cross-sectional view taken generally along the line 7—7 of FIG. 1A; and FIG. 8 is a fragmentary side view, partly in cross-section and partly broken away, illustrating a modification of the invention.

Figure 1A:
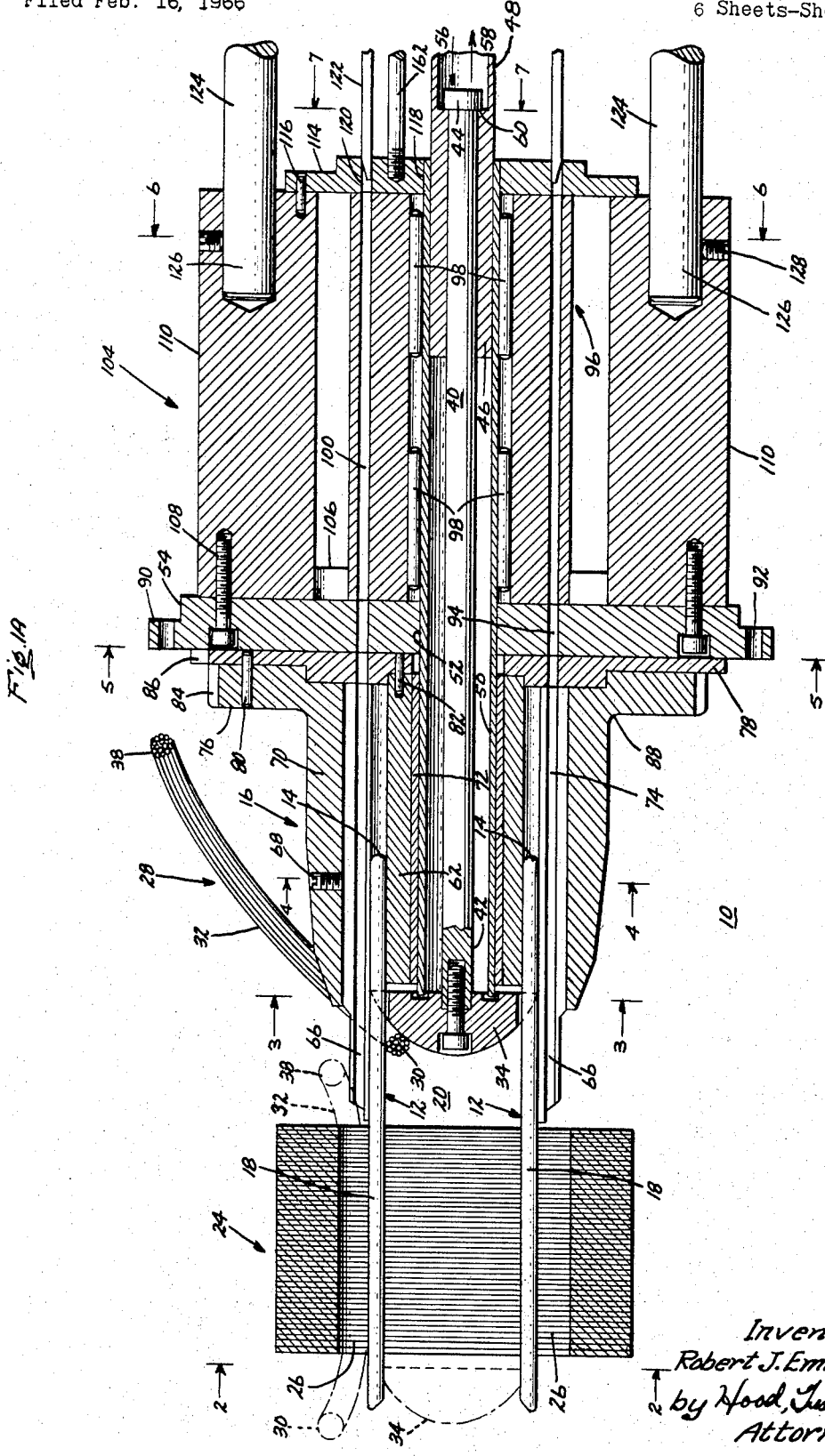
Figure 2:
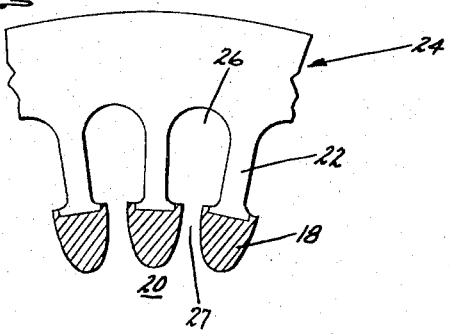
FIG. 2 is a fragmentary, cross-sectional view taken generally along the line 2—2 of FIG. 1A.

Referring now to FIGS. 1 through 7 of the drawings, the improved coil and slot wedge inserting apparatus of the invention, generally indicated at 10, comprises a plurality of elongated finger elements 12 having their inner ends 14 secured in a mounting assembly 16, to be hereinafter more fully described, and having extension portions 18 extending axially outwardly from the mounting assembly 16. Extension portions 18 are radially spaced apart to define a bore 20 and respectively engage teeth 22 of core member 24 which define winding slots 26 therebetween, as best seen in FIG. 2. It will thus be seen that the axially extending spaces 27 between the extension portions 18 of the finger elements 12 respectively communicate with the slots 26 of the core member 24.

Extension portions 18 of the finger elements 12 are adapted to receive the coils 28 to be inserted in the slots 26 of the core 24 with one end turn 30 of each coil extending through the bore 20 and with the coil sides 32 extending outwardly through the spaces 27 between respective pairs of extension portions 18, as more fully described in the aforesaid Adamson patent.

Figure 3:
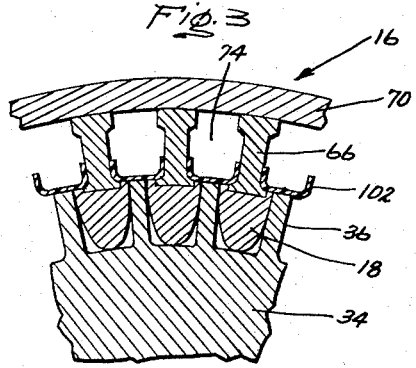
FIG. 3 is a fragmentary, cross-sectional view taken generally along the line 3—3 of FIG. 1A.

A stripper member 34 is provided mounted for axial movement in the bore 20 between the position shown in solid lines in FIG. 1A and the position shown in dashed lines. Stripper member 34 has a plurality of projections 36 which respectively extend radially outwardly in the spaces 27 between the extension portions 18 of the finger elements 12 as best seen in FIG. 3. As further described in the aforesaid Adamson patent, axial movement of the stripper member 34 toward the position shown in dashed lines in FIG. 1A will move the end turns 30 of coils 28 axially along the inner surfaces of the extension portions 18 of the finger elements 12 with the coil sides 32 which extend radially outwardly through the spaces 27 between the respective extension portions 18 thus being progressively inserted into the respective core slots 26 so that, when the stripper member 34 reaches its extreme position as shown in dashed lines in FIG. 1A, the coil sides 32 and the respective end turns 30 and 38 are positioned as shown in dashed lines in FIG. 1A.

A push rod 40 is provided having one end 42 secured to the stripper member 34 and having its other end 44 slidably connected with end 46 of sleeve member 48 with a lost-motion connection. Sleeve member 48 is slidably mounted for axial movement within bearing sleeve 50 which extends through central aperture 52 in mounting plate 54. Thus, axial movement of sleeve member 48 in the direction shown by arrow 56 will result in engagement of end 46 with the stripper member 34 thereby to move the stripper member axially in direction 56 to insert coil 28 in the core slots 26, as above-described. Axial movement of the sleeve member 48 in the opposite direction, as shown by the arrow 58, will result in engagement of shoulder 60 with end 44 of the push rod 40 thereby moving stripper member 34 axially in direction 58 to return it to its normal position as shown in solid lines in FIG. 1A.

Figure 4:
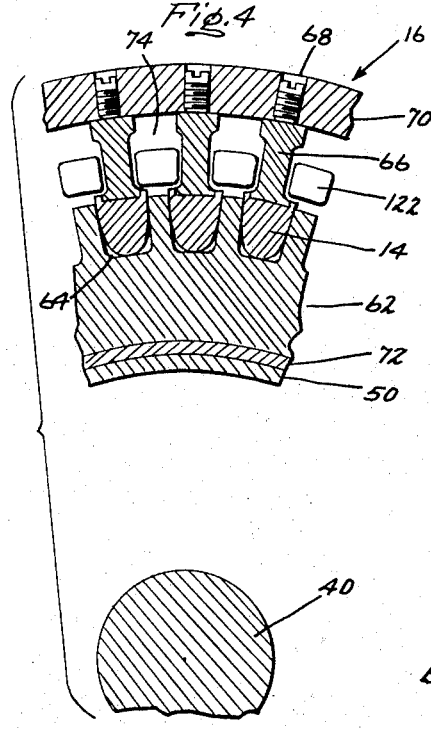
FIG. 4 is a fragmentary, cross-sectional view taken generally along the line 4—4 of FIG. 1A.

Mounting assembly 16 comprises a mounting member 62 having a plurality of axially extending slots 64 formed therein in which inner ends 14 of the finger elements 12 are respectively seated, as best seen in FIG. 4. A plurality of elongated axially extending slot wedge guide members 66 are provided respectively engaging the outer surfaces of the inner ends 14 of the finger elements 12. The slot wedge guide members 66 and finger elements 12 are respectively held in assembled relation by set screws 68 in housing member 70, as best seen in FIG. 4. Mounting assembly 16 comprising housing member 70 and mounting member 62 with the inner ends 14 of the finger elements 12 and slot wedge guide members 66 clamped therebetween is rotatably mounted on sleeve member 50 by suitable bearing means 72.

Slot wedge guide members 66 respectively define axially elongated wedge passages 74 therebetween. It will be seen that with the finger elements 12 and the slot wedge guide members 66 respectively in axial alignment with the teeth 22 of the core member 24, wedge passages 74 will respectively be in axial alignment with the winding slots 26 of the core member 24.

Housing member 70 has a radially outwardly extending flange portion 76 having plate member 78 secured thereto in any suitable manner, as by pins 80. Plate member 78 is likewise secured to mounting member 62 in any suitable manner, as by pins 82. The outer periphery of the flange portion 76 may be provided with suitable external gear teeth 84 and the plate member 78 may be provided with suitable detent notches 86 whereby the entire mounting assembly 16, finger elements 12 and slot wedge guide members 66 may be rotated by external apparatus (not shown) for indexing purposes. Plate member 78 has axially extending passages 88 formed therethrough respectively communicating with the wedge passages 74 defined between the wedge guide members 66.

Mounting plate member 54 has a radially outwardly extending flange portion 90 with suitable mounting openings 92 formed therethrough for mounting the apparatus 10 in a suitable frame and housing (not shown). Mounting plate member 54 also has axially extending wedge passages 94 formed therethrough respectively communicating with the wedge passages 74, 88.

A wedge magazine 96 is provided rotatably mounted on sleeve member 50 by suitable needle bearings 98. Magazine member 96 has a plurality of outwardly facing, axially extending slots 100 formed in its outer periphery in which the slot wedges 102 are loaded and initially retained. Slot wedge receiving openings 100 are respectively in axial alignment with the slot wedge passages 74, 88 and 94. Magazine 96 may be rotated by external apparatus (not shown) or manually rotated so that the slot wedges 102 may be automatically loaded in the slots 100.

A yoke member 104 is provided having a flange portion 106 secured to the mounting plate member 54 in any suitable manner, as by studs 108. Yoke member 104 includes a pair of transversely spaced apart boss elements 110 connected by a web portion 112. Reference to FIG. 6 will reveal that the magazine member 96 is disposed between the boss elements 110 with the wedge receiving slots 100 thus exposed for loading the slot wedges 102 therein. A rear mounting plate member 114 extends across yoke member 104, being secured thereto in any suitable manner as by suitable pins 116. The rear end of bearing sleeve member 50 is supported in opening 118 in the rear mounting plate member 114. Rear mounting plate member 114 has a plurality of openings 120 formed therethrough for accommodating slot wedge pushing elements 122, openings 120 being respectively in axial alignment with the wedge receiving slots 100 in the magazine 96 and in turn with the wedge passages 74, 88 and 94.

A pair of elongated guide rod members 124 is provided respectively having their forward ends 126 secured in openings in the boss element 110 in any suitable manner, as by set screws 128. A pusher plate member 130 is provided having linear bearing portions 132 respectively journaled on the guide rod members 124. A member 134 is secured to the inner surface of the pusher plate member 130 and supports the end 136 of sleeve member 48. Pusher plate member 130 is adapted to be connected to a suitable piston rod 138 of a conventional hydraulic ram (not shown) for moving pusher plate member 130 and the sleeve member 48 in the forward direction, as shown by arrow 56, and retracting the same, as shown by arrow 58. The rear ends 140 of the slot wedge pushing elements 122 are likewise secured to the member 134 and in the rearmost position of the pusher plate 130, the forward ends 142 of the wedge pushing elements 122 project slightly into the openings 120 in the rear mounting plate 114, as shown in FIG. 1B.

It will now be seen that with the pusher plate member 130, sleeve member 48, push rod 40 and pushing elements 122 in the positions shown in FIGS. 1A and 1B, coils 28 may be assembled on the extension portions 18 of the finger elements 12, stator core member 24 assembled on extension portions 18, and slot wedges 102 loaded in the slots 100 of the magazine 96. The hydraulic ram is then actuated to move the piston 138 in the direction shown by the arrow 56, and it will be seen that the ends 142 of the wedge pushing elements 122 will engage the slot wedges 102 in the slots 100 of the magazine 96 thereby moving the same axially through passages 94, 88 and the passages 74 defined by the wedge guides 66. Continued movement in the direction shown by the arrow 56 will cause end 46 of the sleeve member 48 to engage stripper member 34 thereby to move the coils 28 into the bore of the core 24 and to insert the coil sides in the slots 26, as above-described. The length of the sleeve member 48 is proportioned so that end 46 engages the stripper member 34 and initiates movement of the same so that the sides 32 of the coils 28 are inserted in slots 26 slightly in advance of pushing the slot wedges 102 into the slots so that the slot wedges are inserted immediately following insertion of the coil sides, both the coil side and the slot wedges moving simultaneously thereby facilitating insertion of the wedges.

When the coils 28 and slot wedges 102 have been fully inserted in slots 26, the hydraulic ram is actuated to retract the piston 138 in the direction 58 thereby retracting the pushing elements 122. When the shoulder 60 of the sleeve member 48 retracts sufficiently to engage end 44 of push rod 40, the stripper member 34 is then retracted in direction 58 to its initial position as shown in FIG. 1A.

It will be observed that the cross-sectional area of the pushing elements 122 is necessarily very small in relation to their overall length and thus that pushing elements 122 are resultantly flexible. Thus, if any resistance is encountered in the course of pushing the slot wedges 102 through the passages 94, 88 and 74 and into the core slots 26 over the coil sides 32, there is a tendency for the pushing elements 122 to buckle. In order to support the pushing elements 122 intermediate their lengths during the inserting operation and thereby to inhibit such buckling, a supporting member 144 is provided having linear bearing elements 146 mounted on the guide members 124 and having a web portion 148 extending transversely therebetween. Web portion 148 has a central aperture 150 through which sleeve member 48 extends and has openings 152 which support pushing elements 122.

A connecting rod 154 is provided having one end 156 secured to web portion 148 and its other end slidably extending through opening 158 in pusher member 130 and having a stop portion 160 thereon. Another connecting rod member 162 is provided having one end 164 secured to the rear of mounting plate member 114 and its other end slidably extending through an aperture 166 in web portion 148 and having a stop portion 168 thereon. An opening 170 extends through member 134 and pusher member 130 in axial alignment with connecting rod member 162 for permitting passage of stop portion 168 and rod member 162 therethrough as the pusher member 130 is moved in the direction shown by the arrow 156.

It will now be seen that the provision of the support member 144 cuts the span of the pushing elements 122 in half when the apparatus is in its loading position as shown in FIG. 1B. When the hydraulic ram is actuated to move the piston member 138 in the direction shown by the arrow 56 thus moving pusher member 130, sleeve member 48 and the pusher elements 122 in the direction 56, aperture 158 in pusher member 130 accommodates the relative movement of connecting rod member 154 so that support member 144 remains in the position shown. As movement in the direction shown by the arrow 56 continues, bearing portions 132 of the pusher member 130 will engage bearing portions 146 of the support member 144 and thereafter support member 144 will be moved by the push member 130 in the direction 56, aperture 166 in web portion 148 and opening 170 in pusher element 130 accommodating relative movement of the connecting rod member 162. It will now be seen that with the provision of the support member 144, the unsupported span of the pushing elements 122 is at no time greater than the axial distance between the rear mounting plate member 114 and the support member 144 as shown in FIG. 1B.

When the coils and slot wedges have been inserted in the core member 24 as above-described, and the hydraulic ram actuated to move the piston rod 138 in the opposite direction as shown by the arrow 58, pusher plate member 138, sleeve 48 and pushing elements 122 are moved in direction 58. When pusher plate member 130 is moved sufficiently in direction 58 so as to engage stop portion member 160 on connecting rod 154, support member 144 is then moved in direction 58 to return it to its normal position as shown in FIG. 1B in which web portion 148 engages stop portion 168 of connecting rod member 162 thereby to prevent further movement of support member 144.

Referring now to FIG. 8 in which like embodiments are illustrated by like reference numerals, it may be desirable to support the pushing elements 122 at more than one point intermediate their lengths in order to inhibit buckling during the slot wedge inserting operation. Here, two support members 170 and 172 are provided normally equally spaced between the rear mounting plate member 114 and the pusher plate 130. Support members 170, 172 respectively have linear bearing portions 174, 176 respectively slidably mounted upon the guide rod members 124. Support members 170, 172 respectively have web portions 178, 180 having central apertures 182, 184 through which the sleeve member 48 extends and openings 186, 188 which respectively support the pushing elements 122.

A connecting rod member 190 is provided having one end 192 secured to web portion 178 of support member 170 and its other end slidably extending through an aperture 194 in member 134 in pusher member 130 and having a stop portion 196 thereon. Connecting rod member 198 has one end 200 secured to web portion 180 of support member 172 and its other end slidably extending through an aperture 202 in web portion 178 of support member 170 and having a stop portion 204 thereon. Member 134 and pusher element 130 have an opening 206 formed therethrough in axial alignment with the stop portion 204 of connecting rod 198 to accommodate relative movement therethrough of the stop portion 204 and connecting rod member 198. A third connecting rod member 207 has one end 208 secured to the rear mounting plate member 114 and its other end slidably extending through aperture 210 in web portion 180 of support member 172 and having a stop portion 212 thereon. An opening 214 extends through web portion 178 of support member 170 in axial alignment with stop portion 212 of connecting rod member 207 for accommodating relative movement therethrough of stop portion 212 and connecting rod member 207. It will be readily understood that connecting rod member 190 and connecting rod member 207 and along with opening 214 are radially displaced so that they are not in axial alignment.

It will now be seen that when pusher member 130 is moved in direction 56, it will first engage support member 170 and move it in that direction, support member 170 in turn engaging support member 172 as movement in direction 56 continues. It will thus be seen that the unsupported span of pushing elements 122 at no time exceeds the axial distance between the rear mounting plate 114 and the support member 172, as shown in FIG. 8.

Return movement of pusher member 130 in direction 58 is accompanied by engagment of stop portion 196 of connecting rod member 190 with pusher member 130 thereby moving support member 170 in direction 58, this being followed by engagement of stop portion 204 of connecting rod member 198 with web portion 178 of support member 170 thereby returning support member 172 to its normal position, stop portions 204 and 212 preventing movement of support members 170, 172 beyond their normal positions.

While there have been described above the principles of this invention in connection with specific apparatus, it is to be clearly understood that this description is made only by way of example and not as a limitation to the scope of the invention.

What is claimed is:

1. Apparatus for inserting prewound coils and slot wedges into the slots of an internally slotted dynamoelectric machine core member comprising: a plurality of elongated, radially spaced apart finger elements defining a bore, each of said finger elements having one end secured to a mounting member and having a portion extending axially outwardly therefrom, said extension portions being adapted to receive coils to be inserted in said core member with each coil having one end turn positioned in said bore and its sides extending outwardly through the spaces between predetermined pairs of said extension portions, said extension portions being adapted to engage the inner extremities of the teeth of said core member which define said slots whereby the spaces between said extension portions communicate with respective slots; a stripper member mounted for axial movement in said bore; first means for moving said stripper member axially through said bore within said extension portions thereby to move said coil end turns axially along the inner surface of said extension portions whereby said coil sides are inserted in said core slots; said mounting member having a plurality of means for receiving slot wedges to be inserted in said core slots, said receiving means being radially outward from said finger elements and respectively in axial alignment with the spaces therebetween; said mounting member having means respectively in axial alignment with said receiving means for guiding said slot wedges from said receiving means into said core slots over the coil sides therein; a plurality of elongated pusher elements respectively in axial alignment with said receiving and guiding means and mounted for axial movement therethrough, said pusher elements respectively having distal ends, said receiving means being on the side of said guiding means remote from said finger elements and having an axial length longer than that of said core member, said guiding means having an axial length longer than that of said core member, said pusher elements having an axial length at least as long as the total length of said receiving and guiding means, said pusher elements having a cross-sectional width less than that of said core slots, said pusher elements having a first position outside of said receiving and guiding means on the side thereof remote from said finger elements and a second position extending through said receiving and guiding means with their distal ends adjacent said core; second means for moving said pusher elements axially from said first to said second positions thereof whereby said distal ends respectively push said slot wedges axially from said receiving means through said guiding means into said core slots; and means for supporting and guiding said pusher elements intermediate their ends during movement from said first to said second positions thereof thereby to prevent buckling of said pusher elements while pushing said slot wedges from said receiving means into said core slots.

2. The apparatus of claim 1 wherein said first moving means comprises elongated push rod means extending axially through said mounting member having one end connected to said stripper member and having a portion extending axially beyond said mounting member on the side thereof remote from said finger elements, said second moving means comprising a pusher member connected to the other ends of said push rod means and pusher elements; and further comprising guide rod means extending axially from said mounting member on the side thereof remote from said finger elements for guiding said pusher member for axial movement, said supporting means being mounted and guided on said guide rod means for axial movement thereon.

3. The apparatus of claim 2 further comprising means for normally positioning said supporting means intermediate said mounting member and said pusher member.

4. The apparatus of claim 2 wherein said supporting means has a normal position intermediate said mounting member and said pusher member when said pusher elements are in said first position thereof, said pusher member being adapted to engage said supporting means responsive to partial movement of said pusher member axially toward said mounting member and thereafter to move said supporting means to a second position adjacent said mounting member responsive to final movement of said pusher member to move said pusher elements to said second position thereof, and further comprising means for returning said supporting means to said normal position in response to axial movement of said pusher member to return said pusher elements to said first position thereof.

5. The apparatus of claim 2 wherein said supporting means comprises at least one support member extending transversely across said guide rod means, said support member having a normal position intermediate said mounting member and pusher member when said pusher elements are in said first position thereof, said pusher member being adapted to engage said support member responsive to partial movement of said pusher member axially toward said mounting member and thereafter to move said supporting member to a second position adjacent said mounting member responsive to final movement of said pusher member to move said pusher elements to said second position thereof; and further comprising rod means connected to said support member and having a lost motion connection with said pusher member for returning said support member to said normal position thereof in response to axial movement of said pusher member to return said pusher elements to said first position thereof.

6. The apparatus of claim 5 further comprising second rod means connected to said mounting member and having a lost motion connection with said support member for preventing axial movement of said support member beyond said normal position thereof toward said pusher member.

7. The apparatus of claim 5 wherein there are a plurality of said support members normally axially spaced apart between said mounting member and said pusher member when said pusher elements are in said first position, said rod means being connected to the support member adjacent said pusher member; and further comprising other rod means respectively connected to the adjacent support member toward said mounting member and having a lost motion connection with the adjacent support member toward said pusher member, and final rod means connected to said mounting member and having a lost motion connection with the adjacent support member.

References Cited
UNITED STATES PATENTS

| | | | |
|---|---|---|---|
| 2,432,267 | 12/1947 | Adamson | 29—596 |
| 2,934,099 | 4/1960 | Mason | 29—205 X |
| 3,131,465 | 5/1964 | Eminger | 29—205 |
| 3,146,520 | 9/1964 | D'Eustachio | 29—205 |

THOMAS H. EAGER, *Primary Examiner.*